United States Patent
Kochem et al.

(10) Patent No.: US 9,533,476 B2
(45) Date of Patent: Jan. 3, 2017

(54) LABEL FILM FOR ALL-ROUND LABELS

(75) Inventors: Karl-Heinz Kochem, Neunkirchen (DE); Roberto Lozano, Zacapu Michoacán (MX); Duncan Henshall, Greensboro, NC (US)

(73) Assignee: Treofan Germany GmbH & Co. KG (DE)

( * ) Notice: Subject to any disclaimer, the term of this patent is extended or adjusted under 35 U.S.C. 154(b) by 875 days.

(21) Appl. No.: 12/739,005

(22) PCT Filed: Sep. 27, 2008

(86) PCT No.: PCT/EP2008/008242
§ 371 (c)(1),
(2), (4) Date: Aug. 3, 2010

(87) PCT Pub. No.: WO2009/052921
PCT Pub. Date: Apr. 30, 2009

(65) Prior Publication Data
US 2011/0214794 A1  Sep. 8, 2011

(30) Foreign Application Priority Data
Oct. 24, 2007 (DE) .................... 10 2007 050 851

(51) Int. Cl.
| B32B 37/02 | (2006.01) |
| B32B 27/32 | (2006.01) |
| B32B 27/08 | (2006.01) |
| B32B 27/16 | (2006.01) |
| B32B 27/20 | (2006.01) |

(52) U.S. Cl.
CPC ............. *B32B 27/32* (2013.01); *B32B 27/08* (2013.01); *B32B 27/16* (2013.01); *B32B 27/205* (2013.01); *B32B 2250/05* (2013.01); *B32B 2250/242* (2013.01); *B32B 2250/40* (2013.01); *B32B 2264/102* (2013.01); *B32B 2264/104* (2013.01); *B32B 2270/00* (2013.01); *B32B 2307/4023* (2013.01); *B32B 2307/41* (2013.01); *B32B 2307/518* (2013.01); *B32B 2307/538* (2013.01); *B32B 2307/72* (2013.01); *B32B 2307/734* (2013.01); *B32B 2307/746* (2013.01); *B32B 2307/75* (2013.01); *B32B 2519/00* (2013.01); *Y10T 156/10* (2015.01); *Y10T 428/24355* (2015.01)

(58) Field of Classification Search
CPC .............. B32B 27/32; B32B 2250/05; B32B 2250/242; B32B 2250/40; B32B 2264/102; B32B 64/104; B32B 2270/00; B32B 2307/4023; B32B 2307/41; B32B 2307/518; B32B 2307/538; B32B 2307/72; B32B 2307/734; B32B 2307/746; B32B 2307/75; B32B 2519/00; Y10T 428/24355; Y10T 156/10
USPC .......................................... 156/182, 160, 163
See application file for complete search history.

(56) References Cited

U.S. PATENT DOCUMENTS

| 4,472,227 | A | * | 9/1984 | Toyoda et al. ............ 156/244.11 |
| 4,721,544 | A | | 1/1988 | Zodrow et al. |
| 5,496,600 | A | | 3/1996 | Peiffer et al. |
| 5,516,563 | A | | 5/1996 | Schumann et al. |
| 5,618,369 | A | | 4/1997 | Peiffer et al. |
| 5,807,452 | A | | 9/1998 | Schwinn |
| 5,985,074 | A | | 11/1999 | Heemann et al. |
| 6,025,058 | A | * | 2/2000 | Shepherd ...................... 428/215 |
| 6,838,042 | B1 | * | 1/2005 | Wieners et al. .............. 264/509 |
| 2004/0146730 | A1 | | 7/2004 | Holzer et al. |
| 2005/0085579 | A1 | * | 4/2005 | Iida et al. ...................... 524/425 |
| 2008/0044617 | A1 | * | 2/2008 | Schmitz et al. ................. 428/71 |

FOREIGN PATENT DOCUMENTS

| DE | 3515324 A1 | 10/1986 |
| DE | 19522568 A1 | 1/1997 |
| EP | 0312289 A1 | 4/1989 |
| EP | 0367613 A2 | 5/1990 |
| EP | 0611102 A1 | 8/1994 |
| EP | 0622185 A1 | 11/1994 |
| EP | 0798217 A1 | 10/1997 |
| WO | WO-02098658 A1 | 12/2002 |
| WO | WO 2006040057 A1 * | 4/2006 | ............ B29C 51/16 |

* cited by examiner

*Primary Examiner* — Jacob T Minskey
*Assistant Examiner* — Vishal I Patel
(74) *Attorney, Agent, or Firm* — Drinker Biddle & Reath LLP

(57) ABSTRACT

The invention relates to a multi-layer, opaque, biaxially-oriented polyolefin film with a thickness of at least 40 μm including a vacuole-containing base layer B and intermediate layers Z applied on both sides thereof of at least 70% by weight of a propylene homopolymer, and with a thickness of at least 3 μm and a covering layer D on both sides thereof of a mixture of incompatible polymers and respectively a surface roughness Rz of at least 2.5 μm (with a cut-off of 0.25 mm). The invention also relates to the use of this film as a wrap-around label.

21 Claims, No Drawings

LABEL FILM FOR ALL-ROUND LABELS

CROSS-REFERENCE TO RELATED APPLICATIONS

This application is a national stage application (under 35 U.S.C. §371) of PCT/EP2008/008242 filed Sep. 27, 2008, which claims benefit of German application 10 2007 050 851.6, filed Oct. 24, 2007.

BACKGROUND OF THE INVENTION

The present invention relates to a biaxially oriented polypropylene film and its use as wrap-around label.

Label films comprise an extensive and technically complex area. Different labelling techniques are distinguished, which are basically different regarding the process conditions and which inevitably make different demands of the label materials. It is common to all labelling processes that optically pleasing labelled containers have to result.

Very different techniques for applying the label are used with the labelling methods. It is distinguished between self-adhesive labels, wrap-around labels, shrink labels, in-mould labels, patch labelling etc. The use of a film of synthetic thermoplastics as label is possible in all these different labelling methods.

All in-mould labelling methods have in common that the label takes part in the actual forming method of the container and is applied in the meantime. Different forming methods are hereby used, like for example injection moulding methods, blow moulding methods, deep drawing methods.

In the injection moulding method, individual labels are taken from a stack or cut from a roll and are inserted into the injection moulding form. The form is thereby designed in such a manner that the melt flow is injected behind the label and that the front side of the film abuts the wall of the injection moulding form. The hot melt combines with the label during the injection. The tool opens after the injection, the injection moulding article with the label is ejected and cools down. As a result, the label has to adhere without creases and optically in a faultless manner on the container.

With blow moulding, a direct in-mould labelling is also possible. With this method, a melt tube is extruded vertically downwards through a ring nozzle. A vertically-divided forming tool closes and surrounds the tube, which is thereby squeezed together at the lower end. A blow mandrel is introduced at the upper end, through which the opening of the moulded article is formed. Air is introduced to the warm melt hose via the blow mandrel, so that it extends and abuts the inner walls of the moulding tool. Hereby, the label has to join with the viscous plastics of the melt hose. Subsequently, the mould is opened and the excess at the formed opening is cut. The formed and labelled container is ejected and cools down.

With deep drawing, non-oriented thick plastic plates, mostly cast PP or PS (polystyrene) with a thickness of about 200-750 μm are heated and drawn or pressed into a corresponding forming tool by means of a vacuum or stamping tools. Hereby, the individual label is also inserted into the form and joins with the actual container during the forming process. Considerably lower temperatures are used, so that the adhesion of the label at the container can be a critical factor.

Basically, films of synthetic thermoplastics can be used for the labelling of the containers during the forming with all these in-mould methods. For this, the films have to have a chosen property profile, so as to ensure that the label film and the formed mould body abut smoothly and without blisters and join with one another. The adhesion of the label to the container is often inadequate. Furthermore, air bubbles occur between the label and the container, which impair the appearance of the labelled container, and also the adhesion. With in-mould labelling, the speed of the process is essentially determined by the time which is necessary for the forming of the container. The corresponding cycle times, with which the labels are possibly destacked and handled in these methods, are comparatively moderate.

In the prior art, various films are described which are optimised in view of their use as in-mould label. These films often comprise a rough inner surface, that is facing the container, so as to avoid the air bubbles between the container and the label. The outer surface is however optimised in such a manlier that no boundary can be seen between the applied label and the container, for which reason the in-mould labels have glossy outer surfaces. The destacking of such films with in-mould labelling is unproblematic.

In addition to the in-mould labelling, the wrap-around labelling for labelling of non-conical containers and bottles is also very common due to cost reasons. Here, paper is also increasingly substituted by thermoplastic films.

With the wrap-around labelling, a label section corresponding to the print rapport is cut to length, this label section is wrapped around the container, so that the facing edge regions overlap. The edges are glued e.g. with a hot melt adhesive at the overlap, whereby the outer side is glued against the inner side of the label. Alternatively, cut labels are stacked, provided in magazines and are removed individually during the labelling process. Wrap-around labels are predominantly suitable for non-conical containers, or for the cylindrical regions of a container, but every container material can advantageously be labelled in such a manner, for example containers of plastics, such as PET bottles, glass, metal or cardboard.

The destacking of the cut labels is problematic with wrap-around films of thermoplastic film. The container which is already formed is labelled with the wrap-around labelling. The processing speeds are therefore considerably higher than with in-mould methods, with modern plants for example at least 10,000 containers per hour. Even with such high cycle times, it has to be ensured that the cut and stacked label can be separated well and reliably at these high speeds. Adhesion and freedom of bubbles are however not a problem with the wrap-around label.

A further difference between the wrap-around labels and the in-mould labels are the usual printing methods. During the printing of wrap-around labels, the films are initially cut to large format sheets due to cost reasons, onto which are printed several masters side by side. In this printing process, the stacked sheets are also separated with very high cycle times of at least 1000 sheets per hour. The individual wrap-around labels are subsequently cut from the printed sheets and are themselves also stacked. Due to economical reasons, it is desirable to accommodate as many printed images on the sheet as possible, that is, the larger the sheet, the lower the printing costs. But there are limits to this optimisation. The larger the sheets, the more difficult the handling of the film sheets at high cycle times, in particular, the sheets cannot be separated reliably with these destacking speeds during the entry into the printing machine.

EP0798217 describes a method for the wrap-around labelling of containers. According to these teachings, the labels are crimped immediately prior to the application, so as to reduce tensions on the adhesion seam. The specification mentions wrap-around labels made of thermoplastic film.

DE 3515324 describes labelling machines for applying wrap-around labels. This specification does not describe the labelling materials in detail.

EP 0 611 102 describes films of thermoplastic polymers which are used as in-mould labels. The films are constructed of a vacuole-containing base layer and an intermediate layer of propylene homopolymer and covering layers on both sides. The outer covering layer is printable and glossy and constructed of propylene mixture polymers. The opposite covering layer is applied to the base layer and contains two incompatible polymers and is matt. It is described that the matt inner side reduces the blocking against the printable side, whereby individual labels can be removed more easily from the stack. This film is nevertheless still in need of improvement regarding its processability as wrap-around label. In particular, large format sheet cuts cannot be reliably destacked from this film.

In the prior art, a large number of films with a matt or rough surface are known. As mentioned above, the use or polymer mixtures from incompatible polymers in covering layers is often described. This technique is used with transparent and opaque packaging films and with in-mould labels. With the packaging films, a flawless, even, matt appearance is primarily important, whereas the matt layer is supposed to avoid air bubbles between the injected container and the label with in-mould labels. In addition to the mixture of incompatible polymers, further techniques for the generation of rough surfaces are known.

In the prior art, the roughing of the surface by mechanical stamping, for example, is also described. This structuring is particularly advantageous with in-mould labels, so as to enable the escape of the air enclosed between the container and the label.

β nucleating agents, which are added to a propylene homopolymer layer, cause similar effects, whereby a microporous layer is generated. This microporous layer also enables a good deaeration between the container and in-mould label.

Coating films with a filled coating, for example kaolin, is described, whereby a rough surface is produced. Alternatively, high concentrations of pigments can be incorporated into the coextruded covering layers to generate surface roughness.

However, all known label films have the disadvantage that the destacking of the cut and the stacked labels is in need of improvement, particularly with large cuts and high cycle times, the known films cannot be separated reliably.

BRIEF SUMMARY OF THE INVENTION

It was therefore the object of the present invention to provide a film which is improved with regard to the handling and the destackability. The film has to be separated easily during printing in the form of large cuts and to be destacked easily during the labelling process with high cycle times.

This object is achieved by a multi-layer, opaque, biaxially-oriented polyolefin film with a thickness of at least 40 µm of a vacuole-containing base layer and intermediate layers applied on both sides thereof and covering layers on both sides thereof, characterised in that both intermediate layers have a thickness of at least 3 µm and contain at least 70% by weight of a propylene homopolymer, and both covering layers are constructed of a mixture of incompatible polymers and every covering layer comprises a surface roughness Rz of at least 2.5 µm (cut-off 0.25 mm). The dependent claims indicate preferred embodiments of the invention.

DETAILED DESCRIPTION OF THE INVENTION

It was found within the scope of the present invention that the films according to claim 1 surprisingly fulfil all above-mentioned demands with the use as wrap-around label, if intermediate layers of propylene homopolymer are applied on both sides and rough covering layers are applied on both sides, whereby the surface roughness of the two covering layers is generated by the mixture of two incompatible polymers and comprise a minimum value of 2.5 µm (with a cut-off of 0.25 mm).

The mixture of the incompatible polymers, as for example propylene copolymers and/or propylene terpolymers with an incompatible polyethylene generates a surface roughness in a manner known per se. It has been found surprisingly, that a second suchlike rough surface considerably improves the destackability, in particular with large sheets. The known in-mould labels with a glossy surface on one side and with a rough surface on one side cannot be processed as large sheets during the printing. It was furthermore very surprising that the homopolymer intermediate layers contribute to an improved destackability. It was expected that such propylene homopolymer intermediate layers reduce the roughness of the film and thereby deteriorate the destacking. It is known in the prior art that homopolymer intermediate layers are used for the improvement of the surface gloss of opaque films. It was therefore not obvious to incorporate gloss-improving intermediate layers on both sides into a film which is rough on both sides, as a reduction in roughness and thereby an inferior destackability was to be expected hereby. But it was found surprisingly that the destackability improves with the intermediate layers and that comparatively fewer failures occur during the printing of large sheets and during the processing of the wrap-around label. Finally, a minimum thickness of the film of 40 µm has to be adhered to. With thin films having a thickness of <40 µm, problems occur more often in spite of an intermediate layer in connection with rough surfaces on both sides.

It is therefore essential for the present invention that several structural characteristics have to be fulfilled, so as to be able to process the film in the form of large sheets and also during the wrap-around labelling, in particularly to destack it fast and reliably.

The film does not necessarily have to have a symmetrical construction. Rough surface structures on both sides are essential for the improved destackability and the better processability, and intermediate layers on both sides with a minimum thickness of 3 µm in connection with a total thickness of the film of at least 40 µm.

The film thereby comprises at least five layers, whereby the base layer is the central inner layer, which comprises the largest thickness of all layers. The intermediate layers are applied between the base layer and the covering layers, generally directly on the respective surfaces of the base layer. Covering layers are by nature the outer layers of the film, which are directly on the intermediate layers with embodiments having five layers. The film can additionally comprise further layers, if it does not impair the desired properties of the film.

The covering layers contain a propylene homopolymer, copolymer and/or terpolymer of propylene, ethylene and/or butylene units and a polyethylene as components essential to the invention. The covering layers generally contain at least 30 to 95% by weight, preferably 45 to 80% by weight, particularly 50 to 80% by weight of the homopolymers, copolymers and/or terpolymers, and 5 to 70% by weight, preferably 20 to 55% by weight, particularly 20 to 55% by weight of the polyethylene, relative to the weight of the respective covering layer, and possibly additionally usual additives in respective effective quantities. The portion of polymers reduces correspondingly insignificantly when such additives are admixed.

Suitable copolymers or terpolymers are constructed of ethylene, propylene or butylene units, whereby terpolymers contain three different monomers. The composition of the copolymers or terpolymers from the respective monomers can vary within the limits described in the following. The copolymers and/or terpolymers generally contain more than 50% by weight propylene units, that is, they are propylene copolymers and/or propylene terpolymers with ethylene and/or butylene units as comonomers. Copolymers generally contain 60 to 99% by weight, preferably 65 to 97% by weight propylene, and at the most 1 to 40% by weight, preferably 3 to 35% by weight ethylene or butylene as comonomer. Terpolymers generally contain 65 to 96% by weight, preferably 72 to 93% by weight propylene, and 3 to 34% by weight, preferably 5 to 26% by weight ethylene, and 1 to 10% by weight, preferably 2 to 8% by weight butylene. The melt index of the copolymers and/or terpolymers is generally 0.1 to 20 g/10 min (190° C., 21.6N), preferably 0.1 to 15 g/10 min. The melting point can be in a region of 70 to 150° C., preferably 100 to 140° C.

The above-mentioned copolymers and terpolymers can possibly be mixed with one another.

The portions of copolymer to terpolymer can hereby vary in arbitrary limits. This mixture is then used in every covering layer in the above quantities described for the respective copolymers and terpolymers.

In a further embodiment, propylene homopolymer can be used instead of or in addition to the mentioned copolymers and/or terpolymers. This modification can comprise a shortened shelf life of the pretreatment, so that this embodiment is not preferred but is possible, the inner surface of the wrap-around label can particularly comprise such a rough covering layer of propylene homopolymer and polyethylene, if this is not provided for a printing. The homopolymers are used in the quantities described for the copolymers and terpolymers. Suitable propylene polymers are those which are described in detail in the following as propylene homopolymers of the base layer. The homopolymers can possibly also be mixed with the copolymers and/or terpolymers. The portion of copolymer and/or terpolymer is then correspondingly reduced by the portion of homopolymer.

It is essential for the invention that the parts of copolymer and/or terpolymer, possibly homopolymer, and polyethylene for the covering layers are chosen from the mentioned quantity regions in such a manner that the surface roughness Rz of each covering layer is at least 2.5 µm, preferably 3 to 8 µm. Possibly, further measures such as surface treatment and layer thicknesses and addition of antiblocking agents have to be chosen so that this Rz value is fulfilled. Generally both covering layers are however essentially free from particle-shaped fillers, that is, their quantity is generally below 5% by weight, preferably below 2% by weight, so as to avoid the disadvantages such as chalking, additionally, the printed image deteriorates through fillers. This recommendation is not contrary to the additional incorporation of antiblocking agents, which are generally used in a quantity of below 2% by weight.

The second component of the two covering layers essential to the invention is a polyethylene which is incompatible with the copolymers and/or terpolymers, possibly propylene homopolymers, described above. Incompatible in this context means that a surface roughness is formed by the mixture of the propylene homopolymers, copolymers and/or terpolymers with the polyethylene. It is assumed that this roughness results from the two separate phases, which form the non-miscible polymers. Suitable polyethylenes are for example HDPE or MDPE. The HDPE generally comprises the properties described in the following, for example an MFI (50 N/190° C.) of larger than 0.1 to 50 g/10 min, preferably 0.6 to 20 g/10 min, measured according to DIN 53 735, and a coefficient of viscosity, measured according to DIN 53 728, part 4, or ISO 1191, in the region from 100 to 450 cm$^3$/g, preferably 120 to 280 cm$^3$/g. The crystallinity is generally 35 to 80%, preferably 50 to 80%. The density, measured at 23° C. according to DIN 53 479, method A, or ISO 1183, is in the region from >0.94 to 0.96 g/cm$^3$. The melting point, measured using DSC (maximum of the melting curve, heating speed 20° C./min), is between 120 and 140° C. Suitable MDPE generally has an MFI (50 N/190° C.) of larger than 0.1 to 50 g/10 min, preferably 0.6 to 20 g/10 min, measured according to DIN 53 735. The density, measured at 23° C. according to DIN 53 479, method A, or ISO 1183, is in the region from >0.925 to 0.94 g/cm$^3$. The melting point, measured using DSC (maximum of the melting curve, heating speed 20° C./minute), is between 115 and 135° C.

The inner covering layer can possibly contain further olefine polymers in small amounts, as far as the functionality is not disturbed thereby, in particular the surface roughness essential for the invention. Polyolefins, for example, are considered here, which are incorporated into the respective covering layer via additive batches.

Propylene ethylene copolymers in a mixture with MDPE or HDPE are preferably used for the covering layers. The ethylene content of the copolymers is preferably 2 to 10% by weight and the melting point is in a region of 120-135° C. The surface of the outer covering layer is particularly advantageously subjected to a corona treatment.

The layer thickness of every covering layer is generally 2 to 10 µm, preferably 2.5 to 8 µm, particularly 3 to 6 µm. An increased covering layer thickness of at least 2.5 µm advantageously contributes to the increase of the roughness and thereby to an improved destacking. The thickness of the two covering layers can be identical, but does not have to be identical. The thicker the covering layers, the greater the thickness of the intermediate layer can be chosen, so that for example embodiments with intermediate layers of 5-10 µm and covering layers of 3-5 µm are preferred.

The surface roughness Rz of the respective covering layer is generally in a region of 2.5-6 µm, preferably 3-5 µm, with a cut-off of 0.25 mm. Here it applies just as it does for the thickness of the film, that the surface roughness can be the same on both sides, but does not have to be the same.

In a particularly preferred embodiment, one or both surfaces is/are subjected using corona, flame, or plasma treatment. This treatment improves the adhesive properties of the film surface for a following decoration and printing, that is, to ensure the wettability with and adhesion of printing colours and other decorating means. If necessary, it can be also metallised on one side.

Each one of the two covering layers can additionally contain usual additives such as neutralisation agents, stabilisers, antistatic agents, antiblocking agents and/or lubricants in respectively effective amounts. The following indications in % by weight relate to the weight of the respective base layer.

Suitable antiblocking agents are inorganic additives such as silicon dioxide, calcium carbonate, magnesium silicate, aluminium silicate, calcium phosphate, and the like, and/or incompatible organic polymers such as polyamides, polyesters, polycarbonates and the like, or crosslinked polymers such as crosslinked polymethyl methacrylate or crosslinked silicon oils. The average particle size is between 1 and 6 µm, particularly 2 and 5 µm. The effective quantity of antiblocking agent is in the region of 0.1 to 2% by weight, preferably 0.5 to 1.5% by weight.

Lubricants are higher aliphatic acid amides, higher aliphatic acid esters and metal soaps and polydimethyl siloxanes. The effective quantity of lubricant is in the region of 0.01 to 3% by weight, preferably 0.02 to 1 weight-%, in relation to the inner covering layer. The addition of 0.02 to 0.5% by weight of polydimethyl siloxanes, in particular polydimethyl siloxanes with a viscosity of 5,000 to 1,000,000 mm$^2$/s is particularly suitable.

According to the invention, the film comprises additional intermediate layers between the opaque base layer and the two rough covering layers on both sides. "Opaque film" means a non-transparent film in the sense of the present invention, the light transmission (ASTM-D 1003-77) of which is at the most 70%, preferably at the most 50%.

The opaque base layer of the film contains at least 70% by weight, preferably 75 to 99% by weight, particularly 80 to 98% by weight, respectively in relation to the weight of the base layer, polyolefines or propylene polymers, preferably propylene homopolymers and vacuole-initiating fillers.

The propylene polymer generally contains at least 90% by weight, preferably 94 to 100% by weight, particularly 98 to <100% by weight propylene. The corresponding comonomer content of at the most 10% by weight or 0 to 6% by weight or 0 to 2% by weight consists, if present, generally of ethylene. The indications in % by weight respectively relate to the propylene polymer.

Isotactic propylene homopolymers with a melting point of 140 to 170° C. are preferred, preferably from 150 to 165° C., and a melt flow index (measurement DIN 53 735 at a load of 21.6 N and 230° C.) of 1.0 to 10 g/10 min, preferably from 1.5 to 6.5 g/10 min. The n-heptane soluble part is generally 0.5 to 10% by weight, preferably 2 to 5% by weight, in relation to the starting polymer. The molecular weight distribution of the propylene polymer can vary. The ratio of the weight average Mw to the number average Mn is generally between 1 and 15, preferably at 2 to 10, especially preferred at 2 to 6. Such a close molecular weight distribution of the propylene homopolymer of the base layer is for example achieved by its peroxide degradation or by the production of the polypropylene by means of suitable metallocene catalysts. For the purpose of the present invention, highly isotactic or high crystalline polypropylenes are also suitable, the isotacticity of which according to $^{13}$C-NMR is at least 95%, preferably 96-99%. Such highly isotactic polypropylenes are known per se in the prior art, and are called HIPP and also HCPP.

The opaque base layer contains vacuole-initiating fillers in a quantity of at the most 30% by weight, preferably 1 to 15% by weight, particularly 2 to 10% by weight, in relation to the weight of the base layer. In addition to the vacuole-initiating fillers, the base layer can contain pigments, for example in a quantity of 0.5 to 10% by weight, preferably 1 to 8% by weight, especially 1 to 5% by weight. The indications relate to the weight of the base layer.

Pigments in the sense of the present invention are incompatible particles which essentially do not lead to the vacuole-forming during the stretching of the film. The dyeing effect of the pigments is caused by the particles themselves. "Pigments" generally have an average particle diameter of 0.01 to a maximum of 1 µm, preferably 0.01 to 0.7 µm, especially 0.01 to 0.4 µm. Pigments include so-called "white pigments" which dye the films white, and also "coloured pigments" which give the film a coloured or black colour. Usual pigments are materials like e.g. aluminium oxide, aluminium sulphate, barium sulphate, calcium carbonate, magnesium carbonate, silicates such as aluminium silicate (kaolin clay) and magnesium silicate (talcum), silicon dioxide and titanium dioxide, of which white pigments such as calcium carbonate, silicon dioxide, titanium dioxide and barium sulphate are preferably used.

The titanium oxide particles generally consist of at least 95% by weight of rutile and are preferably used with a coating of inorganic oxides and/of organic compounds with polar and nonpolar groups. Such coatings of TiO$_2$ are known in the prior art.

"Vacuole-initiating fillers" in the sense of the present invention are solid particles which are incompatible with the polymer matrix and which result in the formation of vacuole-like cavities when the films are stretched, whereby the size, type, and number of the vacuoles depend on the size and the amount of the solid particles and the stretching conditions such as the stretching ratio and stretching temperature. The vacuoles reduce the density and give the films a characteristic nacreous, opaque appearance, which arises due to light scattering at the boundaries "vacuole/polymer matrix". The light scattering at the solid particles themselves generally contributes comparatively little to the opacity of the film. The vacuole-initiating fillers usually have a minimum size of 1 µm, so as to lead to an effective, that is, opaque-producing amount of vacuoles. The average particle diameter of the particles is generally 1 to 6 µm, preferably 1.5 to 5 µm. The chemical character or the particles plays a subordinate role, if incompatibilities are present.

Usual vacuole-initiating fillers are inorganic and/or organic materials which are incompatible with polypropylene, such as aluminium oxide, aluminium sulphate, barium sulphate, calcium carbonate, magnesium carbonate, silicates such as aluminium silicate (kaolin clay) and magnesium silicate (talcum) and silicon dioxide, of which calcium carbonate and silicon dioxide are preferably used. The polymers typically used which are incompatible with the polymers of the base layer are considered as organic fillers, particularly copolymers of cyclic olefins such as norbornenes or tetracyclododecenes with ethylene or propylene, polyesters, polystyrenes, polyamides, halogenated organic polymers, whereby polyesters such as polybutylene terephthalates are preferred. "Incompatible materials or incompatible polymers" in the sense of the present invention means that the material or polymer exists in the film as a separate particle or as a separate phase.

The density of the film can vary in a region from 0.5 to 0.85 g/cm$^3$, depending on the composition of the base layer. The vacuoles account thereby for a reduction of the density, whereas pigments as e.g. TiO$_2$ increase the density of the film due to the higher specific weight. The density of the film due to the vacuole-containing base layer is preferably 0.6 to 0.8 g/cm$^3$.

The base layer can additionally contain usual additives such as neutralisation agents, stabilisers, antistatic agents and or lubricants in respectively effective amounts. The following indications in % by weight respectively relate to the weight of the base layer.

Preferred antistatic agents are glycerine monostereates, alkali alkane sulphonates, polyether-modified, that is, ethoxylated and/or propoxylated polydiorganosiloxanes (polydialkylsiloxanes, polyalkylphenylsiloxanes and the like) and/or the essentially straight-chained and saturated aliphatic tertiary amines with an aliphatic residue with 10 to 20 carbon atoms, which are substituted with ☐ hydroxy-($C_1$-$C_4$)-alkyl groups, whereby N,N-bis-(2-hydroxyethyl)-alkylamines with 10 to 20 carbon atoms, preferably 12 to 18 carbon atoms in the alkyl residue, are particularly suitable. The effective quantity of antistatic agent is in the region of 0.05 to 0.5% by weight.

Lubricants are higher aliphatic acid amides, higher aliphatic acid esters, waxes and metal soaps and polydimethylsiloxanes. The effective quantity of lubricant is in the region of 0.01 to 3% by weight, preferably 0.02 to 1% by weight. The addition of higher aliphatic acid amides in the region of 0.01 to 0.25% by weight in the base layer is particularly suitable. Particularly suitable aliphatic acid amides are erucic acid amide and stearyl amide.

The usual stabilising compounds for ethylene, propylene, and other olefin polymers can be used as stabilisers. Their added amount is between 0.05 and 2% by weight. Phenolic and phosphitic stabilisers such as tris-2,6-dimethyl phenylphosphite are particularly suitable. Phenolic stabilisers with a molar mass of more than 500 g/mol are preferred, particularly pentaerythrityl-tetrakis-3-(3,5-di-tertiary butyl-4-hydroxyphenyl)-propionate or 1,3,5-trimethyl-2,4,6-tris(3,5-di-tertiary butyl-4-hydroxybenzyl)benzene. Thereby, phenolic stabilisers are used alone in a quantity of 0.1 to 0.6% by weight, in particular 0.1 to 0.3% by weight, phenolic and phosphitic stabilisers in the ratio 1:4 to 2:1 and in a total quantity of 0.1 to 0.4% by weight, in particular 0.1 to 0.25% by weight.

Neutralisation agents, where are also used in the remaining layers, are preferably dihydrotalcite, calcium stearate, and/or calcium carbonate with an average particle size of at most 0.7 μm, an absolute particle size of less than 10 μm, and a specific surface of at least 40 m²/g. In general, 0.02 to 0.1% by weight are added.

The intermediate layers according to the invention contain at least 70% by weight, preferably 80 to 100% by weight propylene homopolymer. Preferred are isotactic propylene homopolymers, which can possibly contain up to 2% by weight ethylene as comonomer (minicopo), with a melting point of 140 to 170° C., preferably from 150 to 165° C., and a melt flow index (measurement DIN 53 735 with a load of 21.6 N and 230° C.) from 1.0 to 10 g/10 min, preferably from 1.5 to 6.5 g/10 min. The n-heptane soluble part of the polymer is generally 0.5 to 10% by weight, preferably 2 to 5% by weight, relating to the starting polymers. The molecular weight distribution of the propylene polymer can vary. The ratio of the weight average Mw to the number average Mn is generally between 1 and 15, preferably at 2 to 10, especially preferred at 2 to 6. Such a close molecular weight distribution of the propylene homopolymer of the intermediate layer is for example achieved by its peroxide degradation or by the manufacture of the polypropylene by means of suitable metallocene catalysts. In the intermediate layers, highly isotactic or high crystalline polypropylenes can also be used, the isotacticity according to $^{13}$C-NMR is at least 95%, preferably 96-99%. The intermediate layers can contain the usual additives described for the individual layers such as antistatic agents, neutralisation agents, lubricants and/or stabilisers. The thickness of the intermediate layers is respectively at least 3 μm according to the invention and is preferably in the region of 4-12 μm, especially 6 to 10 μm.

For embodiments where a white appearance with a high opacity of the label is desired, one, possibly both intermediate layer(s) contain pigments, in particular $TiO_2$, for example in an amount of 2 to 8% by weight in relation to the weight of the intermediate layer. The intermediate layers generally do not have any vacuoles and thereby a density of ≥0.9 g/cm³.

The total thickness of the label film is at least 40 μm according to the invention and is preferably in a region of 60 to 100 μm, especially 65 to 80 μm. The inner covering layer in the sense of the invention is the covering layer which faces the container during or after the labelling.

According to the invention, the label film is used as wrap-around label for the labelling of containers of plastics, paper, cardboard, metal, glass or other materials. For labelling the containers with the label film according to the invention, the label is printed, cut and stacked and provided to the labelling machines. These machines usually work in a continuous manner and guide the containers to the actual labelling region via a transport belt. The container is gripped here by a suitable apparatus, for example an inlet star and transferred to a container table. The container is clamped between the container disc and a centring bell and is rotated. A hot paste unit first applies a hot paste strip or individual paste points mostly directly on to the container or to the edge of the label. Subsequently, the rotating container extracts the label from a label magazine with stacked labels via paste strips or the paste points. At the same time, a further hot paste unit glues the label end. The label winds once around the container and is glued at the overlap. The actual labelling process is thereby finished, and the labelled container is transported further.

Surprisingly, the film according to the invention can be processed with a number of cycles of over 20,000 containers per hour in such wrap-around labelling processes. Surprisingly, it is also possible to cut the unprinted sheets into large sheets, for example of at least 0.75 sqm to 2 sqm, preferably 0.8 to 1.6 sqm, to stack them and to print these sheets simultaneously with several rapports. These large format printed sheets are also stacked, transported and finally cut to the original label size. Surprisingly, no noteworthy problems occur also with this processing, in particular the stacking and destacking of the large format cuts. According to the invention, the film can surprisingly be separated and printed with a speed of up to 12000 sheets, preferably 3000 to 9000 sheets per hour. The printed film can also be destacked without problems subsequently during the cutting process.

Furthermore, the present invention relates to a method for manufacturing the polyolefin film according to the invention according to coextrusion methods known per se. In the course of this method, the melts corresponding to the individual layers of the film are coextruded through a sheet die simultaneously and commonly, the film thus obtained is drawn off to solidify on one or more roller(s), the multi-layer film is subsequently stretched (oriented), the stretched film is heat set and possibly plasma, corona, or flame treated on the surface layer provided for treatment.

A biaxial stretching (orientation) is carried out sequentially or simultaneously. The sequential stretching is generally carried out in a subsequent manner, whereby the subsequent biaxial stretching is preferred, where it is initially stretched longitudinally (in the direction of the machine) and then transversely (vertical to the direction of the machine).

The further description of the film manufacture takes place with the example of a flat film extrusion with a following sequential stretching.

The polymer or the polymer mixture of the individual layers is initially compressed and liquefied in an extruder, as is usual with the extruding method, whereby the additives possibly added can already be contained in the polymer or in the polymer mixture. The melts are then pressed simultaneously through a sheet die (flat die), and the extruded multilayered film is drawn off on one or more draw-off rolls at a temperature of 10 to 100° C., preferably 10 to 50° C., whereby it cools down and solidifies.

The film obtained in such a manner is then stretched longitudinally and transversely to the extrusion direction, which leads to an orienting of the molecule chains. The longitudinal stretching is preferably carried out at a temperature of 70 to 130° C., preferably 80 to 110° C., advantageously with the help of two rollers running at different speeds corresponding to the desired stretching ratio, and the transverse stretching preferably at a temperature of 120 to 180° C. with the help of a corresponding clip frame. The longitudinal stretching ratios are in the region of 3 to 8, preferably 4 to 6. The transverse stretching ratios are in the region of 5 to 10, preferably 7 to 9.

After the stretching of the film, its thermal fixing (heat treatment) follows, wherein the film is kept at a temperature of 100 to 160° C. for about 0.1 to 10 s. Subsequently, the film is wound in a usual manner using a winding device.

Preferably, after the biaxial stretching, one or both surface(s) of the film is/are plasma, corona, or flame treated according to one of the known methods. The treatment intensity is generally in the region from 35 to 50 mN/m, preferably 37 to 45 mN/m.

For the corona treatment, it is conveniently proceeded in such a manner that the film is guided between two conductor elements serving as electrodes, whereby such a high voltage is applied between the electrodes, usually alternating voltage (approximately 5 to 20 kV and 5 to 30 kHz), that spray or corona discharges may occur. Through the spray or corona discharge, the air above the film surface is ionised and reacts with the molecules of the film surface, so that polar inclusions form in the essentially nonpolar polymer matrix.

The surface treatment as e.g. corona treatment can take place immediately during the manufacture of the label film and also at a later time, e.g. immediately prior to the printing of the label.

The following measuring methods were used for characterising the raw materials and the films:

Melt Flow Index

The melt flow index of propylene polymers was measured according to DIN 53 735 with a load of 2.16 kg and 230° C., and at 190° C. and 2.16 kg for polyethylene.

Melting Points

DSC measurement, maximums of the melting curve, heating speed 20 K/min.

Density

The density is determined according to DIN 53 479, method A.

Roughness Measurement

The roughness values Rz of the films according to DIN 4768 part 1 and DIN ISO 4288 and DIN 4772 and 4774 by means of a perthometer of the type S8P of the company Feinpruf Perthen GmbH, Göttingen, were measured according to the sensing cut method as measure for the roughness. The measuring head, a one-runner sensing system according to DIN 4772, was equipped with a sensing tip with a radius of 5 μm and a flank angle of 90° with a pressing force of 0.8 to 1.12 mN and a sliding runner with a radius of 25 mm in the sliding direction. The vertical measuring region was adjusted to 62.5 μm, the sensor range to 5.6 mm, and the cut-off of the RC filter according to DIN 4768/1 to 0.25 mm. All Rz values in the present application relate to this cut-off of 0.25 mm.

The invention will now be explained by the following examples.

Example 1

A five-layer pre-film was extruded from a sheet die according to the coextrusion method. This pre-film was drawn off on a chill roll, solidified and afterwards oriented in the longitudinal and transverse direction and finally fixed. The surface of the outer covering layer was pretreated by means of corona for increasing the surface tension. The five-layer film had a layered construction, first (outer) covering layer/first intermediate layer/base layer/second intermediate layer/second (inner) covering layer. The individual layers of the film had the following composition:

| First covering layer (3.0 μm): | |
|---|---|
| ~60% by weight | ethylene propylene copolymer with an ethylene portion of 4% by weight and a melting point of 135° C., melt flow index of 7.3 g/10 min at 230° C. and a load of 2.16 kg (DIN 53 735). |
| 40% by weight | MDPE with an MFI of 0.28 g/10 min (2.16 kg and 190° C.); density of 0.937 g/ccm$^3$ and a melting point of 126° C. |
| 0.1% by weight | SiO$_2$ anti-blocking agent |
| First intermediate layer (7 μm) | |
| 100% by weight | propylene homopolymer (PP) with a n-heptane soluble portion of 4.5 weight-% (in relation to 100% PP) and a melting point of 165° C.; a melt flow index of 3.2 g/10 min at 230° C. and a load of 2.16 kg (DIN 53 735) |
| Base layer | |
| 85.8% by weight | propylene homopolymer (PP) with a n-heptane soluble portion of 4.5% by weight (in relation to 100% PP) and a melting point of 165° C.; and a melt flow index of 3.2 g/10 min at 230° C. and a load of 2.16 kg (DIN 53 735) |
| 10% by weight | calcium carbonate with an average particle diameter of 3.5 μm |
| 4% % by weight | TiO$_2$ with an average particle diameter of 0.1 to 0.3 μm |
| 0.2% by weight | tertiary aliphatic amine as antistatic agent (Armostat 300) |
| Second intermediate layer (4 μm) | |
| 100% by weight | propylene homopolymer (PP) with a n-heptane soluble portion of 4.5% by weight (in relation to 100% PP) and a melting point of 165° C.; and a melt flow index of 3.2 g/10 min at 230° C. and a load of 2.16 kg (DIN 53 735) |
| Second covering layer (5 μm): | |
| ~60% by weight | ethylene propylene copolymer with an ethylene portion of about 4 weight-% (in relation to the copolymer) and a melting point of 135° C.; and a melt flow index of 7.3 g/10 min at 230° C. and a load of 2.16 kg (DIN 53 735) |
| 40% by weight | MDPE with an MFI of 0.28 g/10 min (2.16 kg and 190° C.); density of 0.937 g/ccm$^3$ and a melting point of 126° C. |
| 0.1% by weight | SiO$_2$ anti-blocking agent |

All layers of the film additionally contained a stabiliser and neutralisation agents in usual amounts.

In detail, the following conditions and temperatures were chosen during the production of the film:

extrusion: extrusion temperature about 250° C.
chill roll: temperature 25° C.,
longitudinal stretching: T=120° C.
longitudinal stretching by the factor 4.8
transverse stretching: T=155° C.
transverse stretching by the factor 8
fixing T=133° C.

The film was surface-treated on the surface of the outer covering layer by means of corona. The film had a thickness of 0.7 g/cm³ and a thickness of 75 μm. The roughness Rz on the surface of the first covering layer was 3.0 μm and on the surface of the second covering layer 3.5 μm.

Comparative Example 1

A film according to example 1 was manufactured. Both intermediate layers were omitted compared to example 1. The thickness of the base layer was increased from 56 μm to 67 μm so as to obtain the total thickness of the film. The content of CaCO₃ was reduced to 8.5% by weight to adjust the same thickness of the film. The remaining composition and the method conditions during the manufacture of the film were not changed. The film had a thickness of 0.69 g/cm³ and a thickness of 75 μm. The roughness Rz on the surface of the first covering layer increased slightly to 3.3 μm and was furthermore 3.5 μm on the surface of the second covering layer.

Comparative Example 2

A film according to example 1 was manufactured. In contrast to example 1, the thickness of the outer covering layer was reduced from 3 μm to 1.5 μm. The thickness of the second covering layer was reduced from 5 μm to 1.3 μm. The remaining composition and the method conditions during the manufacture of the film were not changed. The film had a thickness of 0.68 g/cm³ and a thickness of about 70 μm. The roughness Rz on the surface of the first covering layer reduced to 2.0 μl and was only 1.8 μm on the surface of the second covering layer.

Comparative Example 3

A film according to example 1 was manufactured. In contrast to example 1, the outer covering layer only consisted of the indicated propylene ethylene copolymer with SiO₂ addition, that is, the polyethylene was omitted. The layer thickness was reduced to 1 μm. The construction of this film corresponds to the usual in-mould labels according to the prior art. The remaining composition and the method conditions during the manufacture of the film were not changed. The film had a thickness of 0.7 g/cm³ and a thickness of about 73 μm. The film now has a glossy surface on the outer side. The roughness Rz on the surface of the first covering layer reduced to 0.4 and was furthermore 3.5 μm on the surface of the second covering layer.

| No. | Thickness base μm | Density g/cm³ | Thickness DS outside μm | Rz DS outside μm | Thickness DS inside μm | Rz DS inside μm | Thickness ZWS outside μm | Thickness ZWS inside μm | Unstacking of the sheets Number per hour | Unstacking of the labels qualitative |
|---|---|---|---|---|---|---|---|---|---|---|
| Ex. 1 | 56 | 0.70 | 3.0 | 3.0 | 5.0 | 3.5 | 7.0 | 4.0 | 8000 | *** |
| Comp. ex. 1 | 67 | 0.69 | 3.0 | 3.3 | 5.0 | 3.5 | —/— | —/— | 2500 | ** |
| Comp. ex. 2 | 56 | 0.68 | 1.5 | 2.0 | 1.3 | 1.8 | 7.0 | 4.0 | 500 | * |
| Comp. ex. 3 | 56 | 0.70 | 1.0 (without PE) | 0.4 | 5.0 | 3.5 | 7.0 | 4.0 | 100 | * |

\*\*\* unstackable without failures
\*\* occasional failures
\* frequent failures
DS = covering layer
ZWS = intermediate layer
Base = base layer Use According to the Invention The films according to the examples and the comparative examples were cut into large format sheets of 70 cm×70 cm and stacked. The individual sheets were printed with a 4-fold rapport. The rapports were cut from the printed sheets as individual labels, stacked and finally provided to a labelling machine. The labels were used for labelling cylindrically formed containers.

The film according to example 1 could be stacked and separated without any problems during the printing and at the labelling machine. The speed could be increased up to 8,000 sheets per hour during printing.

The films according to the comparative examples could not be processed with this speed, the process speed had to be reduced considerably during the printing and the labelling (see table). In spite of the reduced speed, failures resulted in different scales due to failed or double entry, whereby the printing process or the labelling process had to be partially interrupted.

The invention claimed is:
1. A multi-layer, opaque, biaxially-oriented polyolefin film with a thickness of at least 40 μm comprising:
   a vacuole-containing base layer B and intermediate layers applied on both sides thereof and covering layers on both sides thereof, wherein both intermediate layers have a thickness of at least 3 μm up to 10 μm and contain at least 70% by weight of a propylene homopolymer, and both covering layers are
   constructed of a mixture of incompatible polymers,
   both covering layers have a thickness of at least 2 to 10 μm,
   both covering layers have a surface roughness Rz of at least 2.5 μm up to 8 μm and
   both covering layers contain less than 2% by weight of particle-shaped fillers.
2. The film according to claim 1, wherein said both covering layers are constructed of a mixture of propylene homopolymer, propylene copolymer and/or propylene terpolymer and a polyethylene.
3. The film according to claim 1, wherein each covering layer contains 30 to 95% by weight of propylene homopo- lymer, propylene copolymer and/or propylene terpolymer, in relation to the weight of the respective covering layer.

4. The film according to claim 1, wherein the polyethylene is a HDPE or a MDPE.

5. The film according to claim 1, wherein every covering layer contains 5 to 70% by weight of the polyethylene, in relation to the weight of the respective covering layer.

6. The film according to claim 1, wherein every covering layer contains 5 to 70% by weight of HDPE or MDPE, in relation to the weight of the respective covering layer.

7. The film according to claim 1, wherein one or both covering layers additionally contain antiblocking agents.

8. The film according to claim 1, wherein the thickness of each intermediate layer is 5 to 10 µm, and the thickness of each covering layer is 3 to 5 µm.

9. The film according to claim 1, wherein both intermediate layers have a density of ≥0.9 g/cm$^3$.

10. A wrap-around label which comprises the film according to claim 1.

11. Sheets which comprises the film according to claim 1, wherein the sheets have a size of at least 0.75 sqm and are stacked.

12. A method for printing sheets from the film according to claim 1, which comprises removing the sheets from a stack and printed, wherein the sheets are unstacked with a speed of 3000 to 12000 sheets per hour.

13. A method of wrap-around labelling of containers with a wrap-around label of the film according to claim 1, which comprises removing the wrap-around labels from a stack, wherein the labelling process is carried out with a number of cycles of 10,000 to 20,000 containers per hour.

14. A multi-layer, opaque, biaxially-oriented polyolefin film with a thickness of at least 40 µm of a vacuole-containing base layer B and intermediate layers applied on both sides thereof and covering layers on both sides thereof, wherein both intermediate layers have a thickness of at least 3 µm up to 10 µm and contain at least 70% by weight of a propylene homopolymer, and both covering layers are constructed of a mixture of incompatible polymers, both covering layers have a thickness of at least 2 to 10 µm, and both covering layers have a surface roughness Rz of at least 2.5 µm up to 8 µm and further comprises an antiblocking agent in the base layer in an amount from 0.1 to 2% by weight.

15. The film according to claim 1, which further comprises an antiblocking agent in the base layer an amount from 0.5 to 1.5% by weight.

16. The film according to claim 14, wherein the antiblocking agent is an inorganic additive.

17. The film according to claim 16, wherein the inorganic additive is silicon dioxide, calcium carbonate, magnesium silicate, aluminum silicate, calcium phosphate, or a cross-linked silicon oil.

18. The film according to claim 1, wherein the covering layer contains propylene homopolymer, copolymer and/or terpolymer of propylene, ethylene and/or butylene units and a polyethylene.

19. The film according to claim 1, wherein the covering layers contain at least 30 to 95% by weight of the homopolymers, copolymers and/or terpolymers, and 5 to 70% by weight, of the polyethylene, relative to the weight of the respective covering layer.

20. The film according to claim 1, wherein the covering layers contain at least 50 to 80% by weight of the homopolymers, copolymers and/or terpolymers, and 20 to 55% by weight of the polyethylene, relative to the weight of the respective covering layer.

21. The film according to claim 1, wherein the film is capable of being stacked and separated without any problems during printing and at a labelling machine at speeds up to 8000 sheets per hour.

* * * * *